Feb. 5, 1963  T. J. FULLERTON ETAL  3,076,641
PIPE CUTOFF
Filed July 9, 1959  10 Sheets-Sheet 3
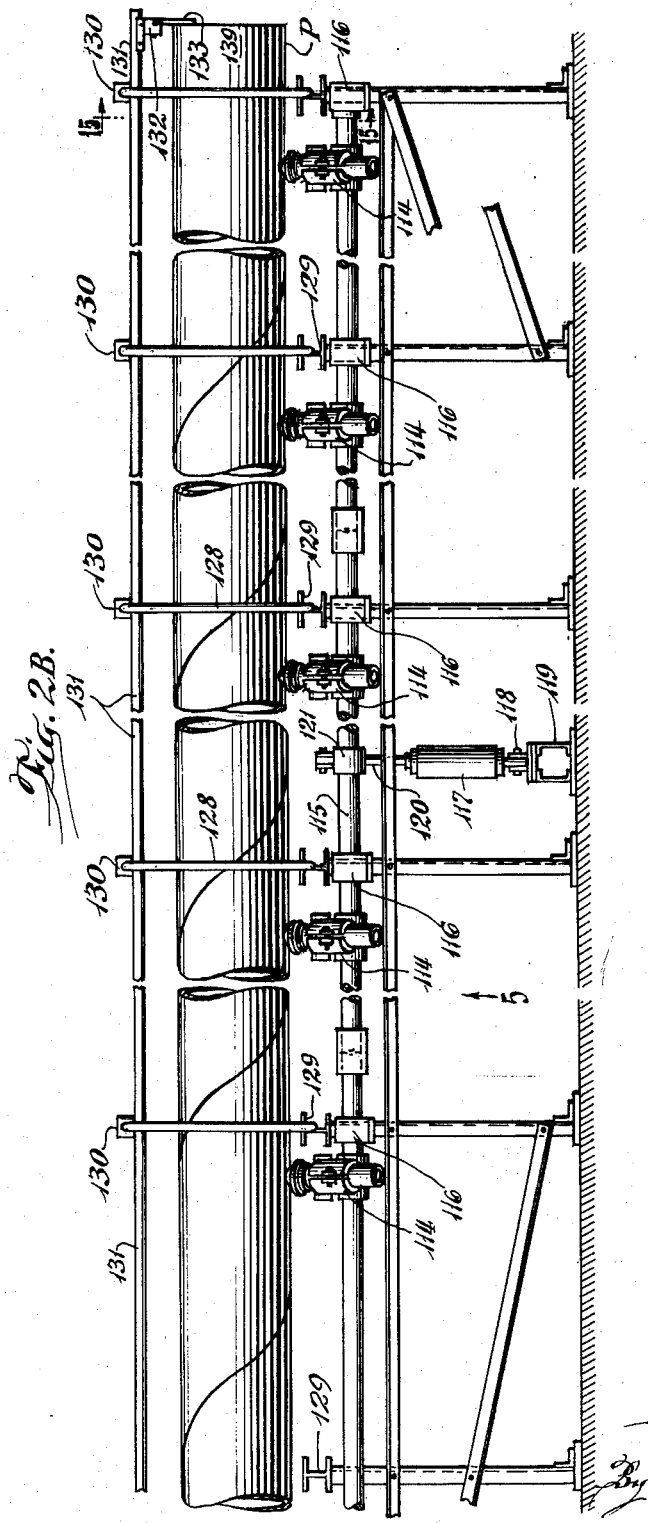
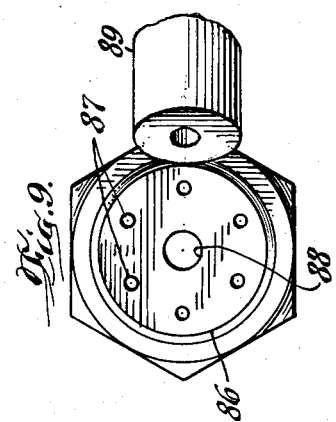
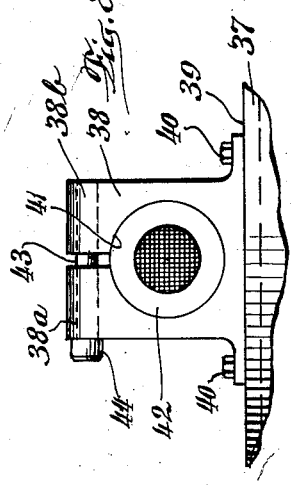
Inventors:
Thomas J. Fullerton
William Schroeder
By William P. Porcelli
Attorney.

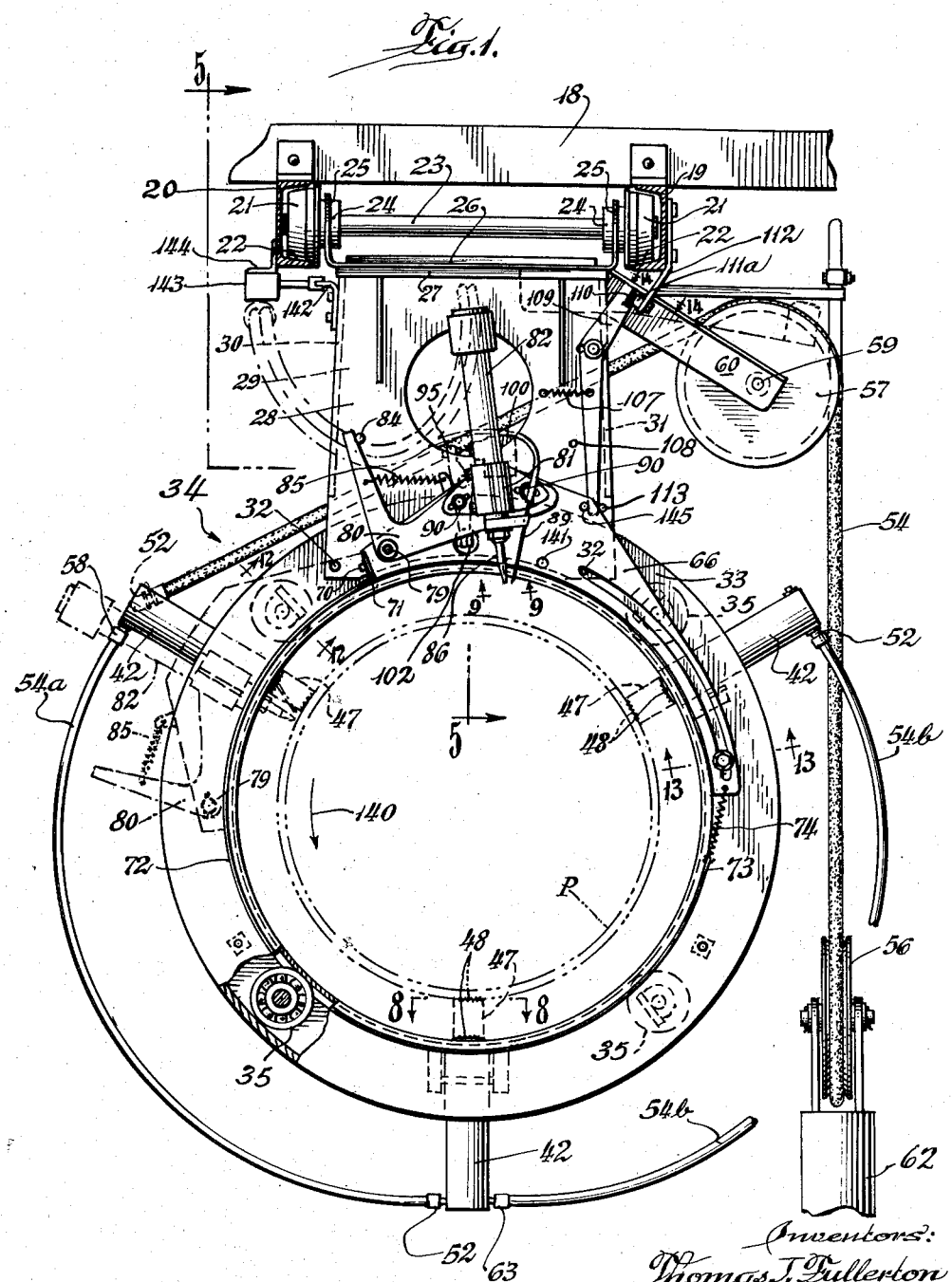

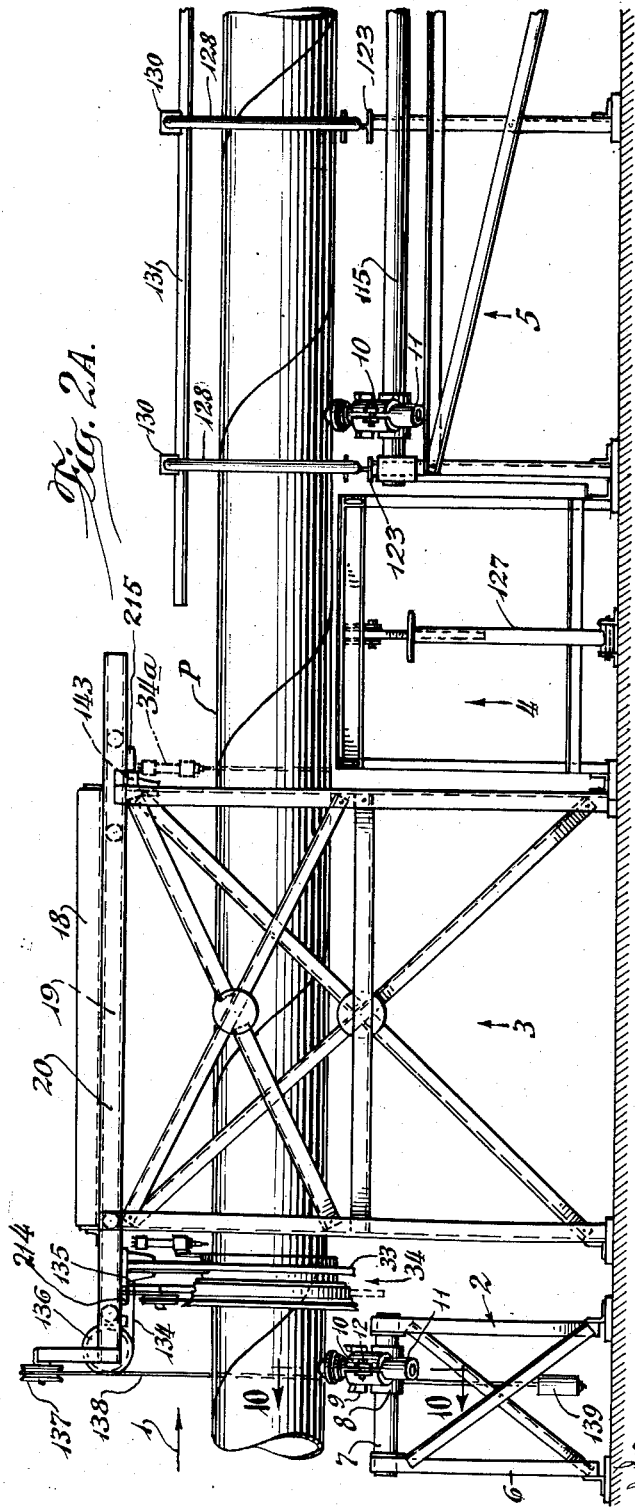

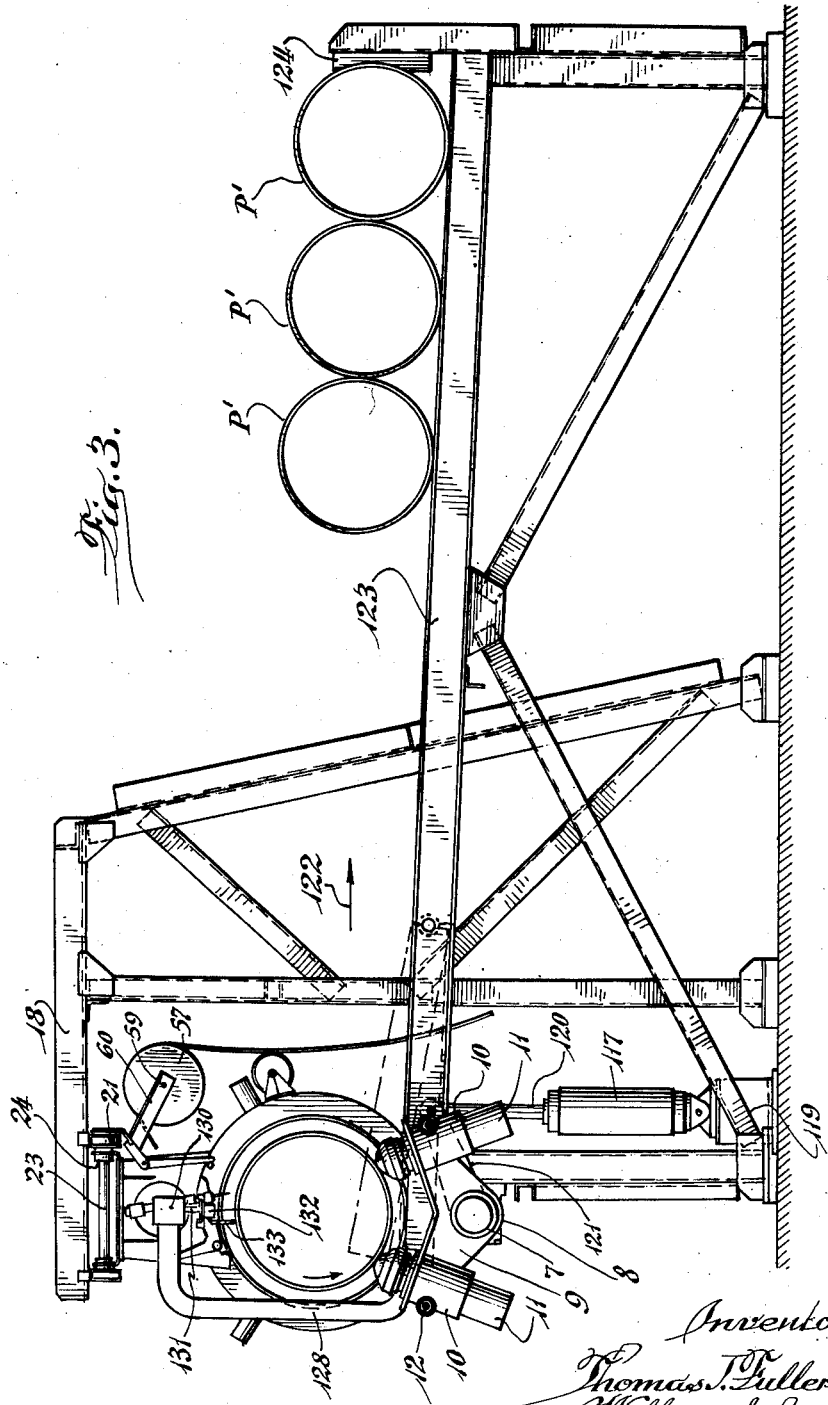

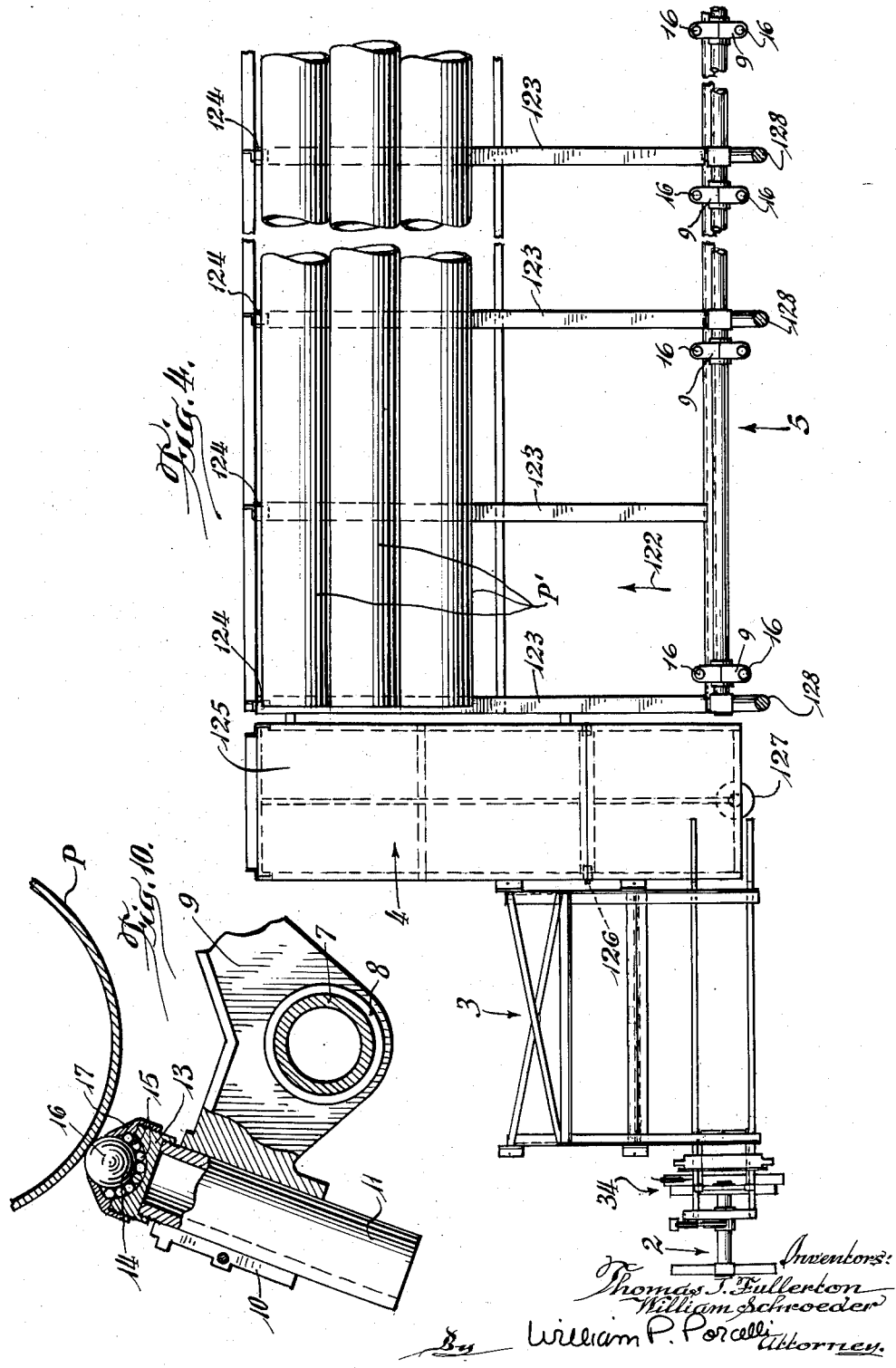

Feb. 5, 1963 T. J. FULLERTON ETAL 3,076,641
PIPE CUTOFF
Filed July 9, 1959 10 Sheets-Sheet 6
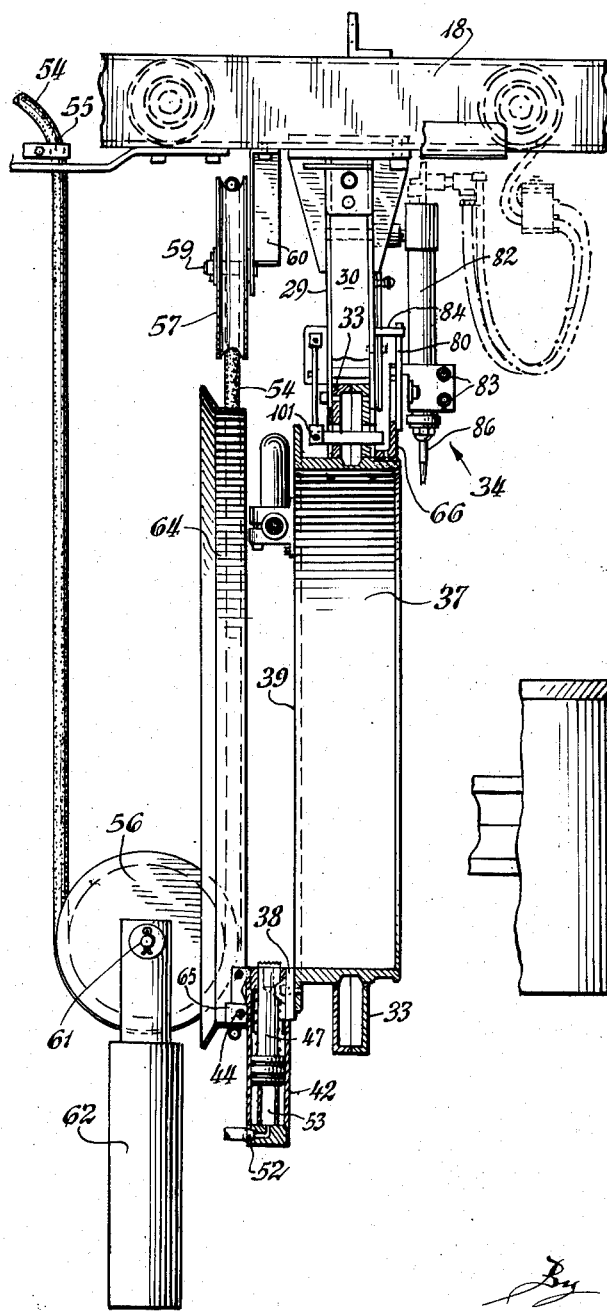
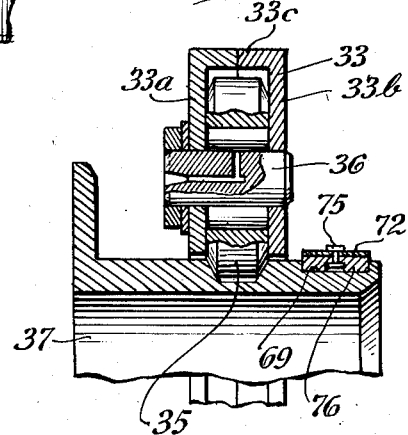
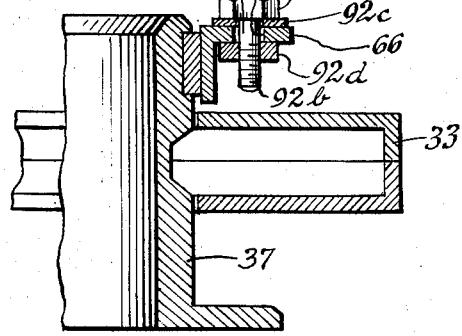
Inventors:
Thomas J. Fullerton
William Schroeder
By William P. Porcelli
Attorney.

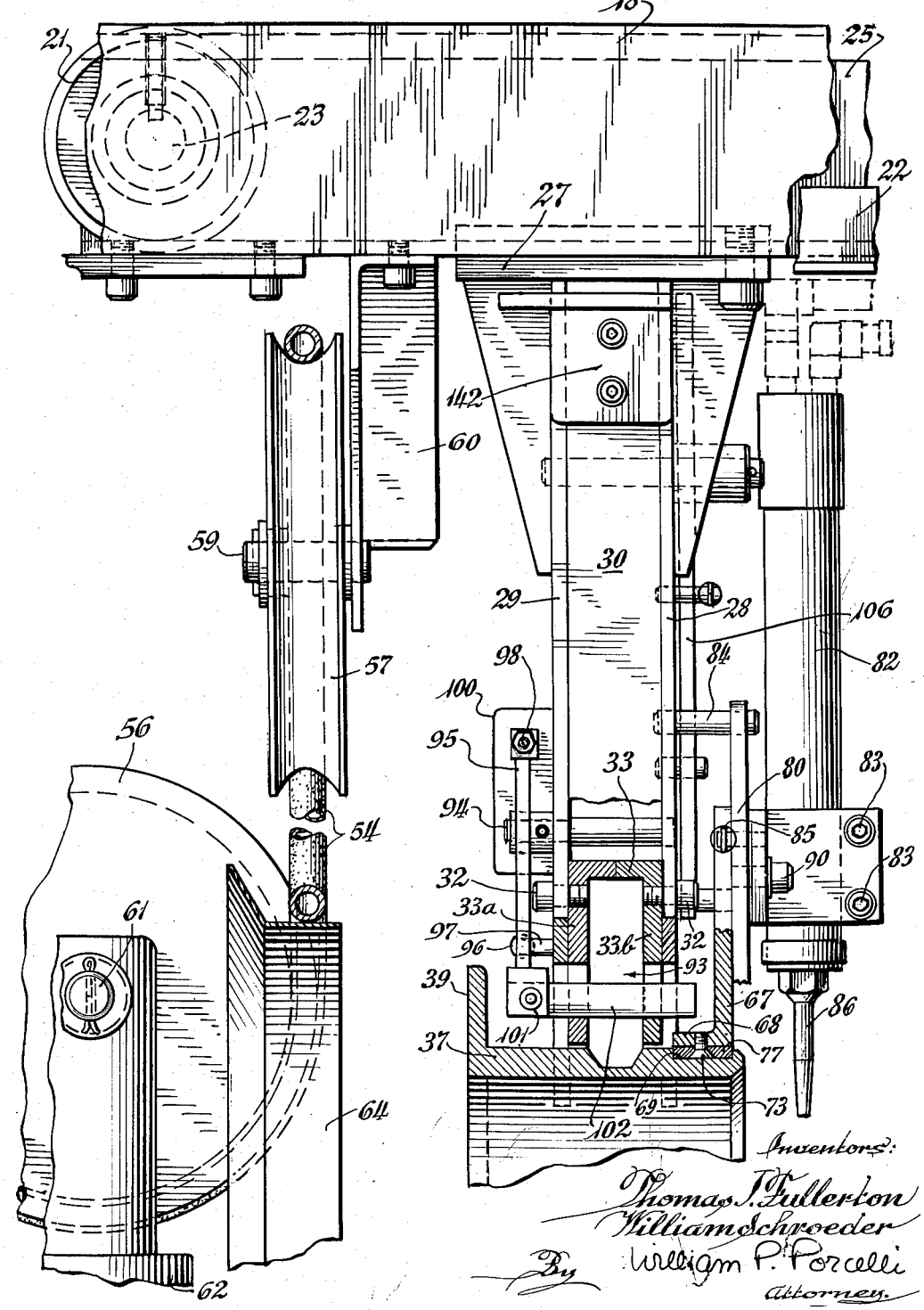

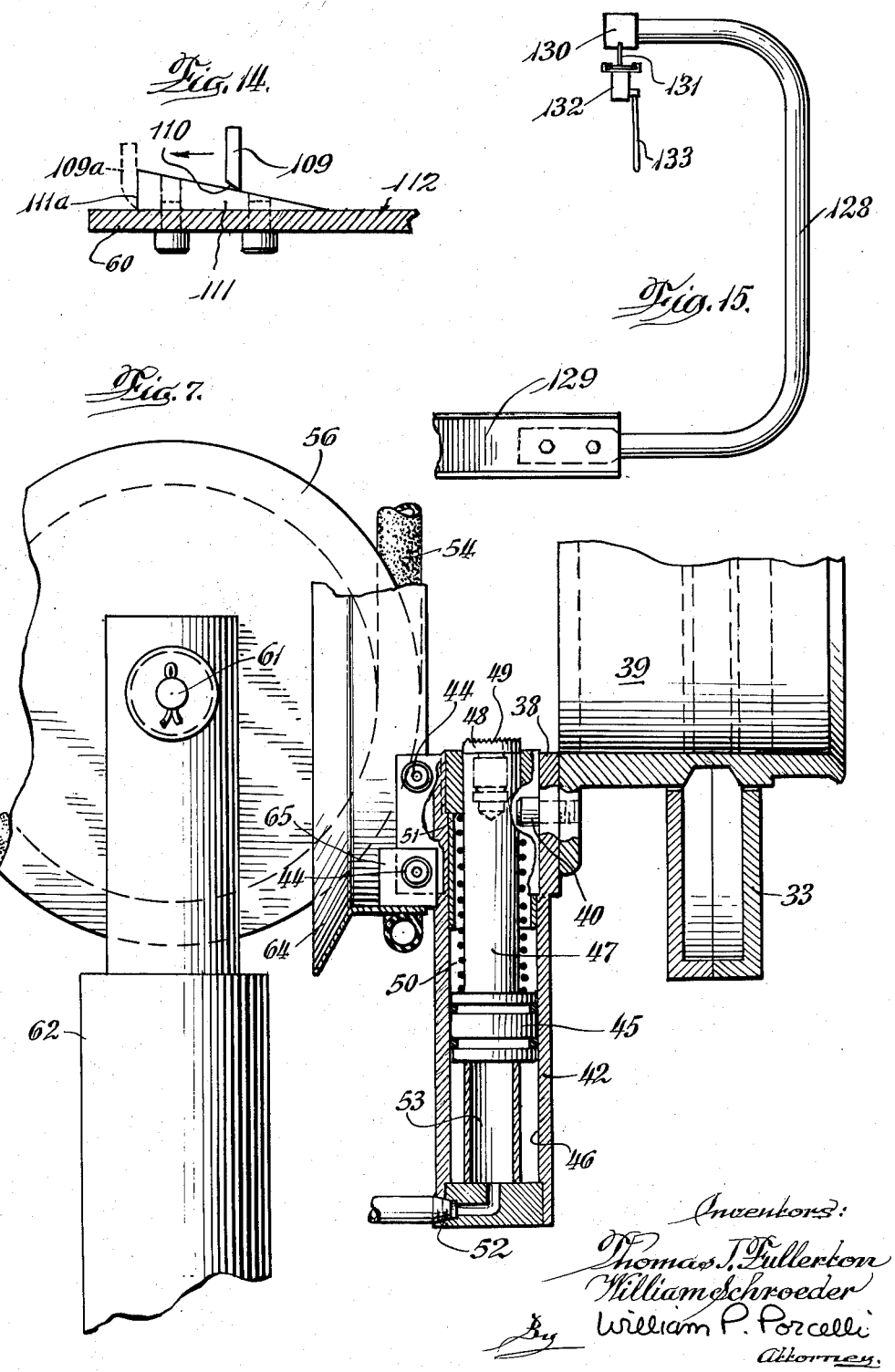

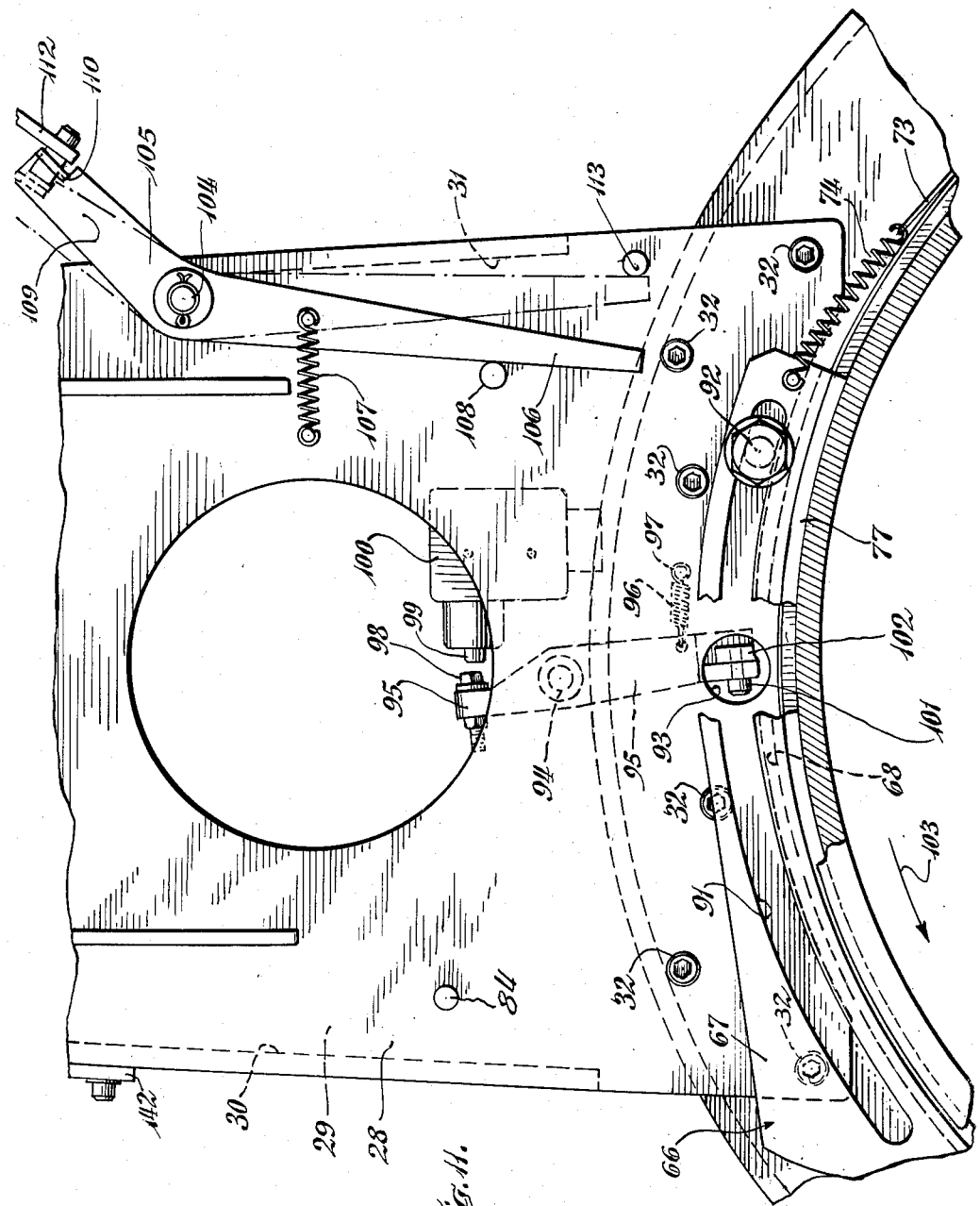

Feb. 5, 1963  T. J. FULLERTON ETAL  3,076,641
PIPE CUTOFF
Filed July 9, 1959  10 Sheets-Sheet 10

INVENTORS
Thomas J. Fullerton
BY William Schroeder
William P. Porcelli
Attorney.

United States Patent Office 3,076,641
Patented Feb. 5, 1963

3,076,641
PIPE CUTOFF
Thomas J. Fullerton, Palos Heights, and William Schroeder, Evanston, Ill., assignors to Acme Steel Company, Chicago, Ill., a corporation of Illinois
Filed July 9, 1959, Ser. No. 825,911
17 Claims. (Cl. 266—23)

This invention relates to the art of pipe making and particularly to an improved pipe cutoff apparatus for cutting to length pipe spirally wound from a continuous metal strip.

In order to maintain maximum production of a machine for forming pipe, it is desirable and probably necessary to cut the formed pipe into separate lengths without interruption of the forming machine. Such a condition of operation imposes certain problems which are not easily solved and which ordinarily would seem to involve complicated and expensive machinery.

It is the principal object of this invention to provide an improved pipe cutoff device which can cut the pipe to length as it emerges from the exit portion of a pipe forming machine, which does not require interruption of the continuous operation of the pipe forming machine, and which is relatively uncomplicated and inexpensive to manufacture and operate.

In order to achieve this objective, a pipe cutoff device is used which is adapted to travel on a carriage at the same speed and in the same direction as the pipe being formed, the pipe itself being the motivating force for the cutoff device. The device of this invention is also particularly applicable to use on spiral wound pipe because the pipe as it is formed is caused to be constantly rotated. Advantage of this is made by allowing a metal cutting torch to be mounted on the carriage in a fixed radial position relative to the center of the pipe so that, as the pipe rotates, the torch cuts through the pipe in a circular path around its circumference.

In addition, improved apparatus is provided whereby the torch is carried with the pipe for a portion of its rotation in order to preheat a spot on the pipe as required prior to cutting through it, after which the angular movement of the torch is arrested while the pipe continues to rotate relative to the torch to thereby be cut around its circumference as mentioned.

Improved cutoff apparatus is also provided whereby the movement of the carriage forward by the pipe stores energy which is released after a segment of pipe is cut, the release of this energy returning the carriage and its related parts to their initial positions for another pipe cutting cycle.

It is still another object of this invention to provide an improved cutoff device for cutting to length spiral pipe as it is being formed from a flat strip wound into a spiral and moved longitudinally forward, said cutoff device being adapted to be carried longitudinally by the pipe during the cutting time while the pipe is rotating, and said cutoff device having adjustable means to vary the time intervals the cutoff device is carried by the pipe in order to adjust to the different angular velocities of the pipe created by changeover in the pipe forming machine to different pipe diameters.

Other improvements of the cutoff device include a switching system which is adjustable to arrange for the cutting of different lengths of pipe as desired and which both initiates and terminates the pipe cutting cycle automatically in response to the continuous movement of the pipe as it is formed and discharged from the pipe forming machine. The switching system also causes the proper air and fuel mixture to be presented to the cutting torch, a different mixture being required for the initial preheat than required for subsequent pipe cutting.

Other objects and advantages of the invention should become apparent upon reference to the accompanying drawings in which:

FIG. 1 shows a front end elevation of a pipe cutoff device embodying this invention;

FIG. 2A shows a side elevation of the front end regions of the structure which carries the pipe cutoff device and includes portions of the pipe run-out table on which the pipe lengths are accumulated after being cut;

FIG. 2B shows a partially cutaway side elevation of the rear end portions of the pipe run-out table and this figure combined with FIG. 2A shows a complete side elevation of the entire apparatus;

FIG. 3 shows a rear end elevation of the apparatus shown in FIGS. 2A and 2B;

FIG. 4 shows a partially cutaway top plan view of the apparatus shown in FIGS. 2A and 2B;

FIG. 5 shows a partial sectional view of the pipe cutoff device as viewed approximately along the line 5—5 of FIG. 1;

FIG. 6 shows an enlarged partially cutaway view of the top portion of FIG. 5;

FIG. 7 shows an enlarged partially cutaway view of the bottom portion of FIG. 5;

FIG. 8 shows a cutaway view of a gripping device as viewed along the line 8—8 of FIG. 1;

FIG. 9 shows an end view of the cutting torch as viewed along the line 9—9 of FIG. 1;

FIG. 10 shows a partial sectional view of a pipe support as viewed along the line 10—10 of FIG. 2A;

FIG. 11 shows a view of the upper portion of the pipe cutoff device of FIG. 1 in an enlarged scale except that the portions are shown in partial cutaway and section and with some parts differently positioned than as shown in FIG. 1;

FIG. 12 is a sectional view along the line 12—12 of FIG. 1;

FIG. 13 is a sectional view along the line 13—13 of FIG. 1;

FIG. 14 is a partial sectional view along the line 14—14 of FIG. 1;

FIG. 15 is a partial view along the line 15—15 of FIG. 2B;

Figure 16:
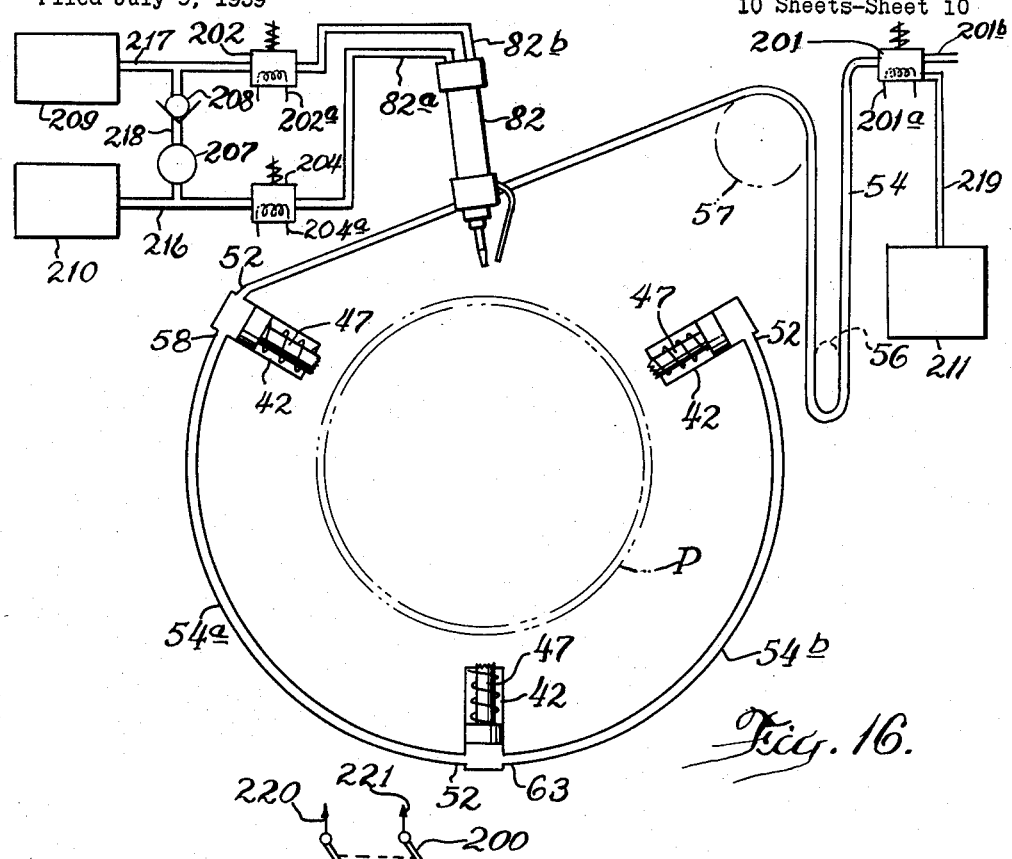
FIG. 16 shows a diagrammatic representation of the air operated portions of the invention.

As spiral wound pipe is manufactured in a pipe forming machine, it is fed longitudinally forward and emerges from the exit end of the forming machine as a continuous length of spiral wound pipe. The spiral pipe forming machine does not constitute any part of this invention. As this pipe which is labeled as P in the drawings emerges from the pipe forming machine and is fed longitudinally in the direction of the arrow 1, as shown in FIG. 2A, the pipe P passes into the region of the apparatus embodying this invention. As shown in FIGS. 2A, 2B, 3 and 4, the apparatus consists of an inlet pipe support structure 2, a pipe cutoff support structure 3, a pipe rejection table 4 and a pipe run-out table or support 5. The inlet pipe support structure 2 consists of an angle iron structure 6 supporting at its upper ends a pipe 7 which is secured at its ends to the structure 6. On the pipe 7 between its ends is secured a sleeve 8 which supports a modified V-shaped frame 9 which is provided with two split sleeves 10 at its lateral ends. These split sleeves 10 encircle tubes 11 which are held clamped in the split sleeves 10 when screws 12 are tightened. The tubes 11 are threaded at their upper ends and provided with end caps 13 screwed onto these threaded ends.

Each end cap 13 is provided with a concave cup shaped recess 14 into which are positioned a plurality of metal balls 15. A larger metal ball 16 is positioned on each group of smaller balls 15 and an apertured end cap 17 is positioned to retain all of the balls positioned as shown in FIG. 10. This end cap 17 is screwed onto the externally threaded end cap 13. The opening through the end cap 17 is smaller than the diameter of the large ball 16 in order to maintain assembly of the balls. In operation, the pipe P is slid forward on the large balls 16 and the pipe is cradled between the two balls 16 positioned on opposite sides of the pipe 7. These large balls 16 are free to roll on the smaller balls 15 and this gives a rolling surface as the pipe P is moved forward.

Beyond this inlet pipe support structure 2 is the cut-off support structure 3. It consists of braced uprights which support an overhead frame 18. This overhead frame 18 is provided with two parallel channel shaped rails 19 and 20 depending therefrom. These rails 19 and 20 support two each of four wheels 21 which are attached to roll along the inside flanges 22 thereof. These wheels 21 are journaled on shafts 23 which are supported in bearings 24 in the side walls 25 of a channel 26. The lower face of the channel 26 is secured to a plate 27 which supports two depending side walls 28 and 29 at their upper ends. These side walls 28 and 29 are spaced from each other by means of end walls 30 and 31 and their lower ends are secured by means of screws 32 to the upper portion of a fixed ring 33. The fixed ring 33 supports the movable portions of the pipe cutter and these movable portions combined with the fixed ring 33 and the other members connecting it to the wheels 21, constitute the pipe cutter movable carriage 34 which is best shown in FIGS. 1, 5 and 6.

The fixed ring 33 is referred to as being fixed because it is not capable of movement other than by longitudinal movement along the rails 21 with the entire carriage 34. It is therefore fixed with respect to the carriage 34. As indicated particularly in FIGS. 5, 6, 12 and 13, the fixed ring 33 is channel shaped, having two side walls 33a and 33b and an end wall 33c. At four positions equally spaced around this fixed ring 33 are four wheels 35 which are journaled on shafts 36 mounted between the side walls 33a and 33b. These wheels 35 freely rotate on the shafts 36 and support at their peripheries a rotatable ring 37 which can be rotated on these wheels 35 relative to the fixed ring 33.

As best shown in FIGS. 1, 5, 6, 7 and 8, the rotatable ring 37 is provided with three brackets 38 secured to one face 39 of it by means of screws 40. These three brackets 38 are positioned at equally spaced intervals about the rotatable ring 37. Each of the brackets 38 is provided with a circular aperture 41 which forms a sleeve into which a cylinder 42 is positioned. Each of the brackets 38 is provided with a slit 43 which divides the bracket into two halves 38a and 38b. Two screws 44 are passed trough other openings in these halves 38a and 38b which, when tightened, draw the two halves 38a and 38b closer together to narrow the slit 43. When this occurs, a tight clamping action occurs which causes the bracket 38 to be gripped tightly on the cylinders 42. When the screws 44 are loosened, the cylinders 42 can be adjusted longitudinally of the apertures 41. Inside of the cylinders 42 are pistons 45, each of which is guided along the internal bore 46 of a cylinder. A piston rod 47 is attached to each of the pistons 45 and the outer end of each of the piston rods 47 is provided with a gripper plate 48 having a roughened or toothed outer surface 49. A coil spring 50 is provided around the piston rod 47 and its ends react between the piston 45 and a fixed shoulder 51 within the bore 46. This spring ordinarily maintains the piston 45 in a retracted position. In order to extend the piston 45, an air inlet passage 52 is provided at the end of the cylinder opposite to the location of the piston rod 47. When air is supplied under pressure through this inlet 52, it passes into the chamber 53 to react against the piston 45 and cause its piston rod 47 to extend against the pressure of the spring 50. When the air pressure is shut off, the spring 50 automatically retracts the piston 45. As viewed in FIG. 1, when the pitson rods 47 are extended, they grip the pipe P as indicated by phantom lines. When they are retracted, the pipe P is no longer gripped by them. In order to supply air under pressure to each of the inlets 52 of the cylinders 42, a flexible air hose 54 is provided which leads from a conventional source of air pressure to the cylinders 42. A portion of the hose 54 is connected in a fixed position by a clip 55 to the frame of the carriage 34. The hose 54 passes from this region down and around a sheave 56 and up over another sheave 57 and then leads to an inlet connection 52 leading into the first cylinder 42. The sheave 57 is pivoted on a shaft 59 on an arm 60 secured to the carriage 34. The sheave 56 is freely suspended by the hose 54 and it in turn supports on a shaft 61 a weight 62. This weight 62 maintains the hose 54 under constant tension. Each of the cylinders 42 are provided with air inlets 52 as previously described. An air outlet 58 is provided adjacent the air inlet 52 of the first cylinder 42. The air outlet 58 is connected to one end of a hose segment 54a whose other end is connected to inlet 52 of the second cylinder 42. This second cylinder 42 is provided with an outlet 63 which has connected to it one end of another hose segment 54b whose other end is connected at air inlet 52 of the third air cylinder 42. With this arrangement, when air under pressure is admitted to the hose 54, the air is introduced into all three of the cylinders 42 practically simultaneously so that their piston rods 47 extend to their gripping positions together.

It has been stated that the rotatable ring 37 rotates on the wheels 35 relative to the fixed ring 33. When this occurs, the hose 54 is drawn around the sheaves 56 and 57 while the region in the vicinity of the clip 55 is held fixed. When this occurs, the sheave 56 is raised which in turn raises the weight 62. Also, when this occurs the length of hose 54 leading from the sheave 57 begins to wind about the circular portions of the carriage. To accommodate this winding and to prevent interference of the hose 54 with the pipe P which would ordinarily be positioned through the rings of the carriage 34 at this time, a large flanged sheave 64 is provided around the outer periphery over which the hose 64 can accumulate. This sheave 64 is provided with three tabs 65, one adjacent each of the cylinders 42, where each is secured to a bracket 38 on one of the screws 44 previously described (see FIG. 7).

As shown in FIGS. 1, 5, 6, 11 and 13, a secondary torch carrying frame 66 is provided. This frame 66 is of L-shape composed of an upright wall 67 and a bottom wall 68 connected at a right angle to it. The bottom wall 68 of this frame 66 is curved to correspond to the curvature of an annular groove 69 provided about the periphery of the rotatable ring 37. This frame is connected at one end by a screw 70 to one end 71 of a brake strap 72. The other end 73 of the brake strap is linked by a spring 74 to the other end of the frame 66. The brake strap 72 is secured by means of rivets 75 to a brake lining 76. This brake lining 76 also engages the same groove 69 in which the bottom wall 68 of the frame 66 is positioned so that when the frame 66 is moved around the rotatable ring 37, the brake lining 76 is dragged around also as the brake band 72 is pulled by the frame 66. The spring 74 is provided so that when the rotatable ring 37 is rotated in a clockwise direction as viewed in FIG. 1, the brake will tend to be released as the spring 74 stretches so that there is less tendency to cause the frame 66 to be frictionally rotated with the rotatable ring 37. However, when the rotatable ring 37 is rotated in the opposite direction, the spring 74 will contract and the brake lining 76 will tend to grip the rotatable ring 37 more tightly with the result that there will be greater tendency to frictionally rotate the frame 66 with the rotatable ring 37. A suitable liner strip 77 is secured to the bottom wall 68 of the frame 66 by means of rivets 78. This strip 77 is not a braking strip, but rather a smooth surfaced strip which permits the frame 66 to slide easily relative to the rotatable frame 37.

Pivoted on a shaft 79 to one end of the frame 66 is the primary torch carrying frame 80. This frame 80 is of L-shape. Its one end carries a bracket 81 which is in the form of a split sleeve through which a torch 82 is positioned telescopically. As viewed in FIGS. 5 and 6, the split bracket 81 is provided with two screws 83 which can be tightened to tighten the bracket 81 onto the torch 82. When the screws 83 are loosened, the torch 82 can be shifted longitudinally of the bracket 81. This adjustment provides means for moving the cutting end of the torch closer or further from the vicinity of the pipe in order to provide the proper metal cutting action. The other end of the frame 80 is unsupported except that it ordinarily rests in contact with a stop pin 84 secured to the plate 28 of the carriage 34. A spring 85 biases the frame 80 in a clockwise direction relative to the secondary frame 66 as viewed in FIG. 1.

The torch 82 is a conventional type metal cutting torch ordinarily supplied with oxygen and acetylene gases. The upper end of the torch 82 is provided with hose connections connected to flexible hoses to properly supply the torch 82 with the volume of these gases required. The lower end of the torch 82 is provided with a nozzle 86 which, as shown in FIG. 9, has a plurality of small openings 87 surrounding a larger opening 88. The openings 87 supply the required mixture of oxygen and acetylene gases at lower pressures which are used during the warm up period prior to actually cutting through the pipe. After the warm up period, high pressure oxygen is supplied through the opening 88 and this produces the required condition for cutting through the pipe metal. A smaller tube 89 is provided adjacent to the nozzle 86. This tube 89 provides a constant flow of air and gas in a very small quantity for the purpose of having a continuous pilot flame constantly available. The bracket 81 is mounted on the primary frame 80 by means of screws 90 and the openings in the bracket 81 through which the screws 90 are connected, are necessarily of large circular or slotted shapes so that the torch 82 can be adjusted angularly if required.

As shown in FIGS. 1, 11 and 13, the frame 66 is provided with a slot 91 extending for a portion of its length along an arc at its one end. A screw 92 with an enlarged head 92a extends through the slot 91 with its threaded end 92b protruding from the opposite side of the slot. A washer 92c is provided between the head 92a and the frame 66 on the one side of the slot while a nut 92d is screwed onto the threaded end 92b on the opposite side of the slot 91. When the nut 92d is loosened, the screw 92 can be adjusted to any position along the length of the slot 91. By tightening the nut 92d, the screw 92 can be secured in any fixed position along the slot 91. As will later be explained in more detail, the protruding end 92b is used as a stop to limit the movement of the frame 66 at a time when it is rotated with the rotatable ring 37. This end 92b also is used to initiate a micro-switch which causes the high pressure oxygen to be introduced into the torch for cutting, as will also be explained in more detail.

As particularly shown in FIGS. 1, 5, 6 and 11, there is an opening 93 provided through the plate 28 of the carriage 34. This opening 93 extends not only through this plate 28, but also through the two walls 33a and 33b of the fixed ring 33 and the wall 29 of the carriage. Secured to the wall 29 behind the wall 28 is a pivot pin 94 which pivotally supports a lever 95 which is urged in a counter clockwise direction as viewed in FIG. 11 by means of a spring 96 connected between the lever 95 and a pin 97 secured to the plate 29. The lever 95 at its upper end is provided with an adjustable stop 98 which is attached to contact the plunger 99 of the micro-switch 100 to cause the introduction of high pressure oxygen to the torch 82, as previously mentioned. This switch 100 is secured to the plate 29 on the carriage 34. The lower end of the lever 95 has fastened thereto by means of a screw 101 a stop arm 102 which extends at a right angle to the lever 95 and through the opening 93 extending through the walls 72, 33a, 33b and 28. The location of the frame 66 and the stop 92 which is carried with it is shown in an initial position in FIG. 1 as all parts would appear prior to a pipe cutting cycle. An intermediate position during the time that the torch is warming a spot prior to cutting is indicated by the location of the parts in FIG. 11, after which time the frame 66 and the stop 92 are carried beyond the positions as shown in FIG. 11 until the stop 92 strikes the stop lever 102 and causes actuation of the micro-switch 100 as mentioned. Approximately upon actuation of the switch 100, the stop lever 102 contacts the wall portions of the opening 93 which appear to the left in FIG. 11. When this occurs, the stop 92 is arrested in its motion and this in turn arrests the motion of the frame 66. Thereafter the rotatable ring 37 continues to rotate in the direction of the arrow 103 (FIG. 11) independently of the stationary frame 66 which holds the torch 82 also fixed. At this time, as the rotatable ring 37 continues rotating, the brake lining 76 drags on the rotatable ring 37. Thus, the function of the brake lining 76 is fulfilled by providing a frictional connection between the frame 66 and the rotatable ring 37 during the initial warm up, the portion of the cycle where the slippage occurs between the brake lining 76 and the rotatable ring 37 not having any functional significance.

Above the lever of the frame 66 is pivoted on a pin 104 another lever 105 having a lower end 106 which is ordinarily biased by a spring 107 to contact a stop pin 108 provided in the plate 28 of the carriage 34. The upper end 109 of lever 105 (FIGS. 11 and 14) is provided with an angular cam surface 110. With the lower end 106 of the lever 105 abutting the stop pin 108, the cam surface 110 is then in interference with the path of a wedged shaped incline or cam 111 secured to a bracket 112 which is fastened to the rail 19. When the lower end 106 is forced against the tension of the spring 107 into contact with another stop pin 113 secured in the plate 28, the angular cam surface 110 is held out of the path of the cam 111. The purpose of this lever 105 and its associated parts will be explained as the entire operation of the machine is explained subsequently.

Prior to the time a length of the pipe is cut, it is fed forward by the ordinary action of the pipe forming machine which is not shown and does not constitute part of this invention. At it is fed forward, it passes through the circular portions of the pipe cutting carriage 34 and onto the balls 16 of the pipe supports 114 which are all identical to the one shown and described in FIGS. 2A and 10. As many of these pipe supports as are required to accommodate the length of pipe to be cut can be used. The pipe supports 114 instead of being mounted on a rigid tube 7 such as is shown in FIGS. 2A and 10 are mounted rigidly on a shaft 115 which is journaled at regions 116 to permit rotation of the shaft 115. An air cylinder 117 is provided with its lower end pivoted on a pivot pin 118 to a fixed frame 119. The piston rod 120 extending from the upper end of the cylinder 117 is secured to a rocker arm 121. Upon extension of the piston rod 120 as pressurized air is properly admitted to the cylinder 117 the shaft 115 is rotated to cause cut pipe lengths P' to be shifted in the direction of the arrow 122 of FIG. 4 to cause the pipe lengths P' to be ejected onto inclined runners 123 where they are accumulated. The far ends of these runners 123 are provided with raised stops 124 which stop the movement of the pipe lengths P'.

Intermediate the support structure 3 of the pipe cutoff device and the run-out table portion 5 is the pipe rejection table portion 4. This consists of a platform 125 which is pivoted on a shaft 126 and which is provided at its front end with a screw jack 127. Adjustment of the screw jack 127 adjusts the incline of the platform 125 to provide the proper incline for allowing pipe lengths to roll down it. This pipe rejection table is used when the machine is first initiated in operation. At this time, when newly formed pipe has been manufactured, its leading end is not squared off. This pipe rejection table is used to catch this imperfect pipe length after it is cutoff square from the rest of the pipe being manufactured. After a square end on the pipe has been achieved there is no further need for this cutoff pipe rejection table 4 until a new pipe is made.

As shown in FIGS. 2A, 2B, 3 and 15, the run-out table 5 is provided with large C-shaped tubular supports 128 at spaced distances along the run-out table. These are secured at their lower ends to frame members 129 of the run-out table 5. The upper ends of each of these supports 128 are provided with portions 130 which are secured to a depending T-shaped rail 131. The rail 131 extends from a region as shown in FIG. 2A to a region as shown in FIG. 2B beyond any other portions of the machine. A microswitch 132 is supported adjustably along this rail 131 so that it can be secured by suitable locking screw means in any fixed position along the rail 131. The switch 132 is provided with a switch arm 133 which depends from it and ordinarily extends into the path of pipe P which is led onto the run-out table 5. The purpose of this switch 132 is to initiate the operation of the pipe cutting device when the proper length of pipe has been fed forward. This switch causes air to enter the gripper cylinders 42 and cause their grippers 48 to grip the pipe P. It also causes oxygen and acetylene to be introduced into the torch for the pipe warm up period prior to cutting. The fact that this switch is adjustable along the rail 131 enables it to control the length of pipe to be cutoff by the apparatus.

As previously mentioned, the pipe cutting carriage 34 is moved along with the longitudinal movement of the pipe P as it is fed forward from a pipe forming machine. As viewed in FIG. 2A, a cable 134 is attached at 135 to a portion of the carriage 34. This cable 134 passes around a sheave 136 and is changed in direction to pass around another sheave 137 from which its other end 138 freely hangs with a weight 139 supported from it. Both of the sheaves 136 and 137 are mounted for free rotation on portions of the frame structure of the apparatus. As the pipe P carries the carriage forward in the direction of the arrow 1 toward the position shown at 34a, the cable 134 is pulled along with it and this causes the weight 139 to raise. The movement of this carriage 34 with this pipe occurs when the gripping cylinders 42 have been actuated to that their gripping surfaces 48 grip the pipe P. When the position at 34a is reached, the grippers are released and the carriage 34 is then free to move back to its original position as shown in FIG. 2A. This return movement is caused by the tension in the cable 134 created by the weight 139.

In operation, all of the parts of the machine are positioned as shown particularly in FIGS. 1, 2A, 2B, 3 and 4. At this time, for purposes of explanation, it is assumed that the pipe forming machine (not shown) is ready to start production. At the time of the start of the production, the first pipe to emerge from the pipe forming machine necessarily has an irregular shaped leading end, assuming also that the pipe is wound spirally from a flat metal strip. Therefore, as this irregular end of the pipe P is led into the apparatus of this invention, it is positioned through the circular opening of the pipe cutting carriage 34. Manual operation of the controls of the machine are preferably performed at this time to initiate the gripping cylinders 42 and cause their grippers 48 to grip the pipe P. In this maner, the pipe cutting apparatus is initiated in its operation to cut off this irregular shaped end so that the newly cutoff end is squared off. After this irregular end is removed, the pipe forming machine continues to present a continuous length of pipe P to the apparatus. Due to the method of manufacture of the pipe being spirally wound, the pipe has a constant speed of rotation as it is fed forward. The pipe continues to be fed forward until its extreme end 139 strikes the arm 133 of the switch 132. When this occurs, the switch 132 energizes a circuit which causes air to enter the gripping cylinders 42 through their inlets 52 through the hose 54. This causes the piston rods 47 of these cylinders to extend so that their gripping portions 48 grip the pipe P as indicated in phantom lines in FIG. 1. Simultaneously with the actuation of these air cylinders, this switch 132 also introduces oxygen and acetylene to the torch 82 for the purpose of providing a proper burning mixture which is sufficient to heat a small area or spot on the pipe P preparatory to burning through the pipe P. Since the tube 89 adjacent the nozzle 86 of the torch 82 is provided constantly with a small flame, as soon as this mixture of oxygen and acetylene is introduced to the torch 82 it emerges through these openings 87 of the nozzle and immediately starts to burn as it contacts the adjacent flame from the pilot tube 89. At this time, since the grippers are gripped onto the pipe P, the rotatable ring 37 which is attached to the brackets supporting the grippers is rotated in the direction of the arrow 140 (FIG. 1). As this occurs, the frictional contact between the brake lining 76 and the rotatable ring 37 causes the secondary torch carrying frame 66 to be carried around with it. As this frame 66 begins to move, the end of the primary torch carrying frame 80 adjacent the stop pin 84 is moved away from the stop pin 84 and then tension of the spring 85 causes this primary torch support frame 80 to pivot on its pivot pin 79 in a clockwise direction as viewed in FIG. 1. This clockwise rotation of the frame 80 continues until the front end of the frame 80 strikes a stop pin 141 projecting from the frame 66 at which time the nozzle 86 of the torch is positioned with its end closely adjacent to the outside wall of the pipe P. It should be noted that while this rotational movement of the rotatable ring 37 and the other parts associated with it occurs, the carriage 34 has begun its travel in the direction of the arrow 1 as viewed in FIG. 2A because the carriage is gripped to the pipe P.

The rotatable ring 37 continues to carry the frame 66 with it until the stop 92b of the screw 92 strikes the stop lever 102 and moves this stop lever 102 to the left side of the opening 93 as viewed in FIG. 11. When the stop lever 102 strikes this side of the opening 93, the stop screw 92 is arrested in its movement and the frame 66 to which it is attached is likewise arrested in its movement even though the rotatable ring 37 continues its circular movement. The fixed position of this screw 92 on the frame 66 along the slot 91 is predetermined based upon how much time is needed for preheating a spot on the pipe P prior to cutting through the pipe wall. The amount of time required is dependent upon the thickness of the pipe wall.

When the movement of the frame 66 has been arrested, this signifies the end of the warm up period and the torch is then ready for the introduction of high pressure oxygen for cutting. Therefore, as the stop 92 contacts the stop lever 102, the pivotal movement of the lever which it causes also causes actuation of the switch 100 as its plunger 99 is depressed by the stop portion 98 on the end of the lever 95. Actuation of this switch 100, as will later be explained, causes the introduction of high pressure oxygen through the opening 88 of the nozzle 86 of the torch 82. The high pressure oxygen then creates the correct mixture of oxygen and gas required to burn entirely through the wall of the pipe. From this time on, the torch 82 is held in a stationary position radially of the pipe because the stop screw 92 rests against the stop lever 102. However, the pipe P continues its rotational movement and thus causes the torch to follow a circular path relative to the surface of the pipe P. As the torch follows this path, it cuts through the wall of the pipe around this circular path. After the pipe is completely severed by the action of the torch, the carriage 34 will have reached the position indicated at 34a in FIG. 2A. When it does, a projecting bracket 142 attached to the carriage 34 (FIG. 1) strikes the actuating arm of a switch 143 which is mounted on a bracket 144 secured to the rail 20. Actuation of the switch 143 causes the air under pressure to be shut off to the gripper cylinders 42. This releases the gripping surfaces 48 from the pipe P and permits the carriage 34 to return to its initial position as shown in FIG. 2A. Actuation of the switch 143 also causes the oxygen and acetylene to be shut off from the torch 82 so that all cutting action is arrested.

At the time that the carriage begins its forward movement in the direction of the arrow 1, the lever 105 (FIGS. 1 and 11) is held by a stop pin 145 so that its end 190 is clear of the wedge shaped cam 111. As the frame 66 is moved with the rotatable ring 37, the arm 105 is pivoted in a clockwise direction where its end 109 is in interference with the path of the cam 111. Therefore, as the carriage 34 approaches the position at 34a of FIG. 2A, the end 109 is deflected as it rides up the top surface of the cam 111 as viewed in FIG. 14. This movement of the end 109 of the lever 105 continues until the end 109 drops into a position shown at 109a in FIG. 14 where it is positioned behind the surface 111a of the cam 111, the tension of the spring 107 causing this latch type operation of the arm 105. The purpose of this lever 105 is to insure that the torch 82 and its supporting frames 80 and 66 are returned to their initial positions as shown in FIG. 1 before the entire carriage 34 begins its return movement from its position at 34a to its original position as indicated in FIG. 2A. Therefore, what actually occurs when the gripping members 48 of the cylinders 42 are released is that the arm 105 prevents this return movement of the carriage until the frame 66 has been returned to its initial position as shown in FIG. 1. When it does return, the stop pin 145 strikes the lower end 106 of the lever 105 and it removes its upper end 109 from behind the surface 111a of the cam 111. As soon as this occurs it signifies that the torch 82 and its carrying frames 80 and 66 have been returned to their initial positions and the carriage 34 is then free to also return to its initial position with the lever 105 clear of the cam 111. The importance of having the torch returned to its initial position before the carriage is returned to its initial position is that it is desirable to have the nozzle 86 of the torch entirely clear of the path of the pipe P, otherwise there is the possibility that a roughened surface or a projection on the pipe P might break off the nozzle 86 or otherwise damage the torch assembly. It should be noted that when the torch is returned to its initial position, the free end of the arm 80 strikes the stop pin 84 to pivot the frame 80 and the torch in a counter clockwise direction clear of the path of the pipe P.

As has been previously mentioned, the return movement of the carriage 34 is effected by the weight 139 pulling on the cable 134 while the return movement of the torch 82 is effected by the weight 62 pulling on the air hose 54. Also, any of the air hose 54 wound onto the sheave 64 will be unwound upon this return movement.

Therefore, what has been described is an apparatus which cuts lengths of pipe, while its rotating end is being moved forward, into lengths having squared ends, the cut being made in a circle around the pipe, the rotational effect of the pipe being used to provide the relative movement between the pipe and the cutting torch while the forward movement of the pipe is counteracted by gripping the carriage 34 to the pipe P.

Variations in the angular velocity and the longitudinal velocity of the pipe P emerging from the pipe forming machine occur when the pipe forming machine is adjusted or regulated to make pipe of different diameter. When the machine is regulated for different type diameter, it can be adjusted to accommodate different width strip or the helix angle of the strip may be varied, or both. Variations of these factors mentioned which change the rotational and longitudinal velocity or speeds of the pipe require that the travel of the carriage 34 be likewise adjustable. The reason for this is that it is only necessary to maintain the cutting action of the torch 82 for the required length of time necessary to complete the circular path around the pipe required to cut it off. In addition, sufficient time must be allowed which can be equated to pipe travel during which the pipe is warmed up prior to being cut. Therefore, the total time that the carriage 34 must travel with the pipe is dependent upon the warm up time plus the cutting time required. The warm up time required varies with the thickness of the strip used, whereas the cutting time varies in accordance with both the angular and longitudinal velocities of the pipe.

As shown in FIG. 2A, a fixed stop 215 is provided adjacent one end of the rail 20. This stop 215 insures that the carriage 34a which strikes it at the end of its forward movement will not move beyond the position shown at 34a. In order to vary the length of travel of the carriage 34, an adjustable stop 214 is provided at the opposite end of the rail 20. With this arrangement, the carriage 34 moves between the two stops 215 and 214. By having the stop 214 adjustable along the rail 20, the starting position of the carriage 34 is varied, the final position at 34a always remaining the same. The manner of locating the adjustable stop 214 is by having it secured to the rail 20 by means of screws which can be removed and fastened in different threaded openings along the length of the rail 20. It has been determined that the rail 20 can be calibrated and charts made experimentally whereby the operator of the machine can set the stop 214 to a predetermined calibration mark along the rail 20 to provide the proper travel of the carriage 34 corresponding to that required for cutting any particular pipe of a particular diameter from a particular width and thickness strip with a particular helix angle. In this manner, adjustment can be readily made to change over to different pipe sizes.

The three switches 132, 100 and 143 have been described with respect to their physical locations on the machines. The switch 132 is located as shown in FIG. 2B at the end of the rail 131 at the end of the run-out table 5, the switch 100 is located, as shown in FIGS. 1 and 11, attached to the plate 29 of the carriage 34, and the switch 143 is supported by the bracket 144 secured to the rail 20 also shown in FIGS. 1 and 2A. As shown in FIG. 16, the previously referred to torch 82, gripping cylinders 42 and the air hose 54 are shown. The torch 82 is provided with two inlet hoses 82a and 82b which are led from two spring return type solenoid valves 202 and 204. Air lines 216 and 217 connect between the solenoid valves 202 and 204 and an oxygen source 210 and acetylene source 209, respectively. Between the air lines 216 and 217 is another air line 218 which has connected in series with it a regulating valve 207 and a check valve 208, the check valve 208 allowing oxygen to flow from the air line 216 to the air line 217, but not in reverse. The solenoid valves 202 and 204 are provided with solenoids 202a and 204a which, when energized, open the valves and allow flow of gas through them. When the solenoids 202a and 204a are deenergized, their spring returns cause them to shut off the gas supply to the torch 82. The three gripping cylinders 42 have their air inlets connected together by means of the hose segments 54a and 54b, as previously described. Also, the first of the gripping cylinder 42 is connected directly to the air hose 54 which passes around two sheaves 57 and 56, as also previously described. The air hose 54 connects finally to a threaded spring return solenoid valve 201. This solenoid valve 201 is in turn connected by an air line 219 to a source 211 of air under pressure. The valve 201 is also connected to an exhaust vent 201b.

Figure 17:
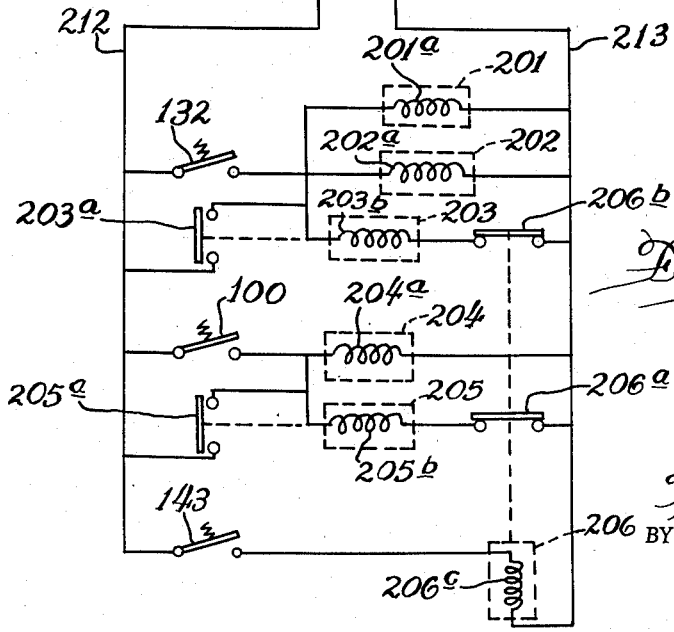
FIG. 17 shows a simplified schematic electrical diagram of the electrical control means for the invention.

Since the operation of the pneumatic or air operated portions of the machine as shown in FIG. 16 are dependent upon the operation of the electric control circuit shown in FIG. 17, a description of the circuit of FIG. 17 seems to be in order first. The switch 200 is an ordinary type master switch which applies available line voltage between wires 212 and 213 of the circuit, the circuit being connected to the line voltage at terminals 220 and 221. Applying this voltage 212 and 213 merely makes the voltage available without energizing any of the components at this time. When a new length of pipe is being formed by the pipe forming machine, the leading end of the pipe is fed in through the circular opening of the cutout carriage 34. The pipe continues longitudinally forward in the direction of the arrow 1 (FIG. 2A) until the end of the pipe contacts the arm 133 of the switch 132 at the end of the run-out table 5. This causes the switch 132 to close which in turn energizes solenoid 201a of the solenoid valve 201, solenoid 202a of the solenoid valve 202 and solenoid 203b of relay 203. Energizing the solenoid 201a causes the valve 201 to direct air under pressure from the source 211 to the gripping cylinders 42 to cause their piston rods 47 to extend and grip the pipe P. Energizing solenoid 202a causes the valve 202 to be open to allow acetylene gas from the source 209 to be fed into the torch 82. This valve 202 also allows oxygen to be supplied from the oxygen source 210 through the valves 207 and 208 to the torch 82. The acetylene and oxygen actually mix in the air line 217 and the amount of oxygen to be mixed with the acetylene is determined by the regulation of the valve 207. Energization of the relay solenoid 203b causes the holding switch 203a of the relay 203 to be closed. This holds the solenoids 201a and 202a of the valves 201 and 202 energized even after the switch 132 might be accidentally reopened because of its spring return.

When the pipe P gripped by the piston rods 47 of the gripping cylinders 42, and the proper mixture of acetylene and oxygen being supplied to the torch 82, the warm up period begins, the pipe P carries the carriage 34 longitudinally with it while the rotation of the pipe P causes the torch 82 to be rotated with the pipe. This portion of the movement causes the heat of the torch 82 to be impinged on a spot portion of the pipe P which portion is thereby heated. At a time determined by the position of the stop screw 92 (FIGS. 11 and 13) the torch 82 stops its rotational movement with the pipe P which signifies the end of the warming period. At this time, the stop screw 92 causes closing of the switch 100 which causes the solenoid 204a of the solenoid valve 204 and also the solenoid 205b of the relay 205 to be energized. Energization of the solenoid 204a opens the solenoid valve 204 to allow high pressure oxygen to be admitted from the oxygen source 210 to the torch 82. Immediately upon the introduction of the high pressure oxygen to the torch 82, the mixture of acetylene and oxygen becomes such that burning occurs entirely through the wall of the pipe P. Since the torch 82 remains stationary at this time while the pipe P still continues to rotate, the movement of the pipe P relative to the torch 82 causes the torch to cut through the pipe around a circular path at its circumference. Energization of the solenoid 205b of the relay 205 causes the relay switch 205a to close which is a holding contact for maintaining the solenoid 204a of the solenoid valve 204 energized even though the switch 100 might be opened because of its spring return.

The carriage 34 continues to move longitudinally with the pipe P until it strikes the fixed stop 215. When this occurs, it signifies the final position of the carriage 34. Simultaneously with the striking of the stop 215, the bracket 142 (FIGS. 1 and 2A) strikes the arm of the switch 143 to cause it to close. When this occurs, the solenoid 206c of the relay 206 is energized and its contacts 206a and 206b are opened. Opening these switches 206a and 206b deenergizes the solenoids 203b and 205b which in turn allows the opening of the hold switches 203a and 205a. When these holding switches 203a and 205a open, the solenoids 201a, 202a and 204a of the solenoid valves 201, 202 and 204, respectively, are deenergized. Deenergizing the solenoid 201a removes the high pressure air from the gripping cylinders 42 which permits their spring returns to retract their piston rods 47 and release the pipe P, the air being directed from the source 211 to an exhaust 201b. Deenergizing the solenoids 202a and 204a shuts off the acetylene and oxygen gases from the torch 82 to arrest the cutting operation.

When the pipe P is released, the carriage 34 which, up to this time, is rotating with the pipe P, begins to rotate back to its original position of FIG. 1 because of the force of the weight 62 as previously described. When the torch 82 has been rotated back to its original position as shown in FIG. 1, the lever 105 (FIGS. 11 and 14) has its end 109 released from the cam 111 so that the carriage 34 can also be returned longitudinally to its original position indicated in FIG. 2A by the force created by the weight 139. When this occurs, all parts are returned to their initial positions and the pipe cutting apparatus is again ready to cut another length of pipe fed into it by a pipe forming machine.

Although only a single embodiment of the invention has been shown and described, it should be understood that the invention can be modified in many ways without deviating from the true scope of the invention as defined by the appending claims.

We claim:

1. Apparatus for cutting to length an elongated object which is being moved longitudinally endwise and rotated on its axis comprising, a frame mounted in a fixed position relative to the moving object, a carriage mounted on said frame for movement along the path of the moving object, said carriage having a member rotatable relative to the carriage, the rotatable member having means for clamping it to the moving object so that the carriage is moved longitudinally with and the rotatable member is rotated with the object, cutting means mounted on and frictionally engaging said rotatable member to cause the cutting means to be rotated by frictional force with the rotatable member as it rotates, stop means being provided between the carriage and the cutting means to limit the rotational travel of the cutting means but not the rotatable member, the cutting means defining a cutting circle around the object as the rotatable member rotates relative to the cutting means.

2. Apparatus for cutting to length an elongated object which is being moved longitudinally endwise and rotated on its axis comprising, a frame mounted in a fixed position relative to the moving object, a circular carriage mounted on said frame for movement along the longitudinal path of the moving object and provided with a circular opening through which the object is passed, said circular carriage having a concentric ring mounted for rotational movement on it, the ring having means for clamping itself to the object to cause the carriage to be moved longitudinally with the object and the ring to be rotated with the object, cutting means mounted on and frictionally engaging said ring to cause the cutting means to be rotated by frictional force with the ring as it is rotated, stop means being provided between the carriage and the cutting means to limit and arrest the rotational travel of the cutting means but not the ring, the cutting means defining a cutting circle around the object as the ring rotates relative to the cutting means.

3. Apparatus as defined by claim 2 including, said stop means being adjustable to vary the amount of rotational travel of the cutting means.

4. Apparatus for cutting to length an elongated object which is being moved longitudinally and rotated on its axis comprising, a non-rotatable carriage, clamping means rotatably mounted on the carriage and adapted to be clamped to the object and cause the carriage to be moved longitudinally with the object while the clamping means rotates with the object, cutting means supported on said clamping means and provided with a driving connection to the clamping means to cause rotation of the cutting means bodily with the clamping means and the object, said carriage having restraining means to arrest movement of the cutting means through slippage of said driving connection as the clamping means continues to be rotated with the object.

5. Apparatus for cutting to length an elongated object which is being moved longitudinally and rotated on its axis comprising, a non-rotatable carriage, clamping means rotatably mounted on the carriage and adapted to be clamped to the object and cause the carriage to be moved longitudinally with the object while the clamping means rotates with the object, a cutting torch supported on said clamping means and provided with a driving connection to the clamping means to cause rotation of the cutting torch bodily with the clamping means and the object, said carriage having restraining means to arrest movement of the cutting torch through slippage of said driving connection as the clamping means continues to be rotated with the object.

6. Apparatus for cutting to length an elongated object which is being moved longitudinally and rotated on its axis comprising, a frame mounted in a fixed position relative to the moving object, a carriage mounted on said frame for movement along the longitudinal path of the moving object, clamping means rotatably mounted on the carriage and adapted to be clamped to the object and cause the carriage to be moved longitudinally with the object while the clamping means rotates with the object, cutting means supported on said clamping means and provided with a driving connection to the clamping means to cause rotation of the cutting means bodily with the clamping means and the object, said carriage having restraining means to arrest movement of the cutting means through slippage of said driving connection as the clamping means continues to be rotated with the object.

7. Apparatus for cutting to length an elongated object which is being moved longitudinally endwise and rotated on its axis comprising, a frame mounted in a fixed position relative to the moving object, a circular carriage mounted on said frame for movement along the longitudinal path of the moving object and provided with a circular opening through which the object is passed, said circular carriage having a ring mounted for rotational movement on it, the ring having means for clamping itself to the object to cause the carriage to be moved longitudinally with the object and the ring to be rotated with the object, a cutting torch mounted on and frictionally engaging said ring to cause the cutting torch to be rotated by frictional force with the ring as it is rotated, stop means being provided between the carriage and the cutting torch to limit and arrest the rotational travel of the cutting torch but not the ring, the cutting torch defining a cutting circle around the object as the ring rotates relative to the cutting torch, a first combustible gas mixture being supplied to the cutting torch when the ring and cutting torch are both rotated with the object to thereby provide means for preheating an area of the object, and a second combustible mixture being supplied to the cutting torch when the ring rotates relative to the cutting torch to thereby provide means for cutting through the object around the cutting circle.

8. Apparatus for cutting to length an elongated object which is being moved longitudinally and rotated on its axis comprising, a frame mounted in a fixed position relative to the moving object, a carriage mounted on said frame for movement along the longitudinal path of the moving object, said carriage having a member rotatable relative to the carriage, the rotatable member having means for clamping it to the object and thereby cause the carriage to move longitudinally with the object and the rotatable member to rotate with the object, the rotatable member supporting a cutting means movable toward and away from the object and rotatable with the rotatable member, a first stop means between the carriage and the cutting means for initially holding the cutting means away from the object, said stop means allowing the cutting means to be moved toward the object when the cutting means is rotated with the rotatable member, the carriage being provided with a second stop means engaging the cutting means to arrest the rotational movement of the cutting means but not the rotational movement of the rotatable member.

9. Apparatus as defined in claim 8 characterized by, said second stop means being adjustable to vary the amount of rotational travel of the cutting means.

10. Apparatus as defined in claim 8 characterized by, the cutting means including a cutting torch, a first combustible mixture being supplied to the cutting torch when the rotatable member and the cutting means are both rotated with the object to thereby provide means for preheating an area of the object, and a second combustible mixture being supplied to the cutting torch when the rotatable member rotates relative to the cutting means to thereby provide means for cutting through the object around the cutting circle.

11. Apparatus for cutting to length a longitudinally moving object comprising, a carriage, means on the carriage for clamping a rotatable portion of the carriage to the object so that the carriage is moved longitudinally in one direction with the object and the clamped portion is rotated with the object, and a cutting means supported by the carriage for cutting the object while the carriage is moved with the object, frictional means between the rotatable portion and the cutting means for causing the cutting means to be rotated in one direction with the rotatable portion, stop means between the carriage and the cutting means for arresting the rotational movement of the cutting means but not the rotatable portion, means in the path of the carriage to cause the clamping means to be released from the object, and return means for returning the carriage, the rotatable portion and the cutting means, to their original positions after the clamping means has been released.

12. Apparatus as defined by claim 11 characterized by, said return means being impeded by a latch means which prevents the return of the carriage until after the rotatable portion and the cutting means are returned.

13. Apparatus as defined by claim 11 characterized by said return means comprising a first weighted cable connected to the rotatable portion for biasing the rotatable portion in a return direction, and a second weighted cable connected to said carriage for biasing the carriage in its return direction.

14. Apparatus for cutting to length an elongated object which is being moved longitudinally and rotated on its axis comprising, a frame mounted in a fixed position relative to the moving object, a carriage mounted on said frame for movement along the longitudinal path of the moving object, said carriage having a member rotatable relative to the carriage, the rotatable member having means for clamping it to the object and thereby cause the carriage to move longitudinally with the object and the rotatable member to rotate with the object, the rotatable member supporting a cutting means movable toward and away from the object and rotatable with the rotatable member, a first stop means between the carriage and the cutting means for initially holding the cutting means away from the object, said stop means allowing the cutting means to be moved toward the object when the cutting means is rotated with the rotatable member, the carriage being provided with a second stop means engaging the cutting means to arrest the rotational movement of the cutting means but not the rotational movement of the rotatable member, the cutting means including a torch, means for supplying a first combustible mixture to the cutting torch when the rotatable member and the cutting means are both rotated with the object for preheating an area of the object, and means for supplying a second combustible mixture to the cutting torch when the rotatable member rotates relative to the cutting means for cutting through the object around the cutting circle, means in the path of the carriage to cause the clamping means to be released from the object after cutting of the object is completed, and return means for returning the carriage, the rotatable portion and the cutting means, to their original positions after the clamping means has been released.

15. Apparatus for cutting to length an elongated object which is being moved longitudinally and rotated on its axis comprising, a non-rotatable carriage, clamping means rotatably mounted on the carriage and adapted to be clamped to the object and cause the carriage to be moved longitudinally with the object while the clamping means rotates with the object, a cutting torch supported on said clamping means and provided with a driving connection to the clamping means to cause rotation of the cutting torch bodily with the clamping means and the object, said carriage having restraining means to arrest movement of the cutting torch through slippage of said driving connection as the clamping means continues to be rotated with the object, said torch being supplied with a first combustible gas mixture for warming the wall of the object and a second combustible gas mixture for cutting through the object.

16. Apparatus for cutting to length an elongated object which is being moved longitudinally and rotated on its axis comprising, a frame mounted in a fixed position relative to the moving object, a carriage mounted on said frame for movement along the longitudinal path of the moving object, said carriage having a member rotatable relative to the carriage, the rotatable member having means for clamping it to the object and thereby cause the carriage to move longitudinally with the object and the rotatable member to rotate with the object, the rotatable member supporting a cutting means movable toward and away from the object and rotatable with the rotatable member, a first stop means between the carriage and the cutting means for initially holding the cutting means away from the object, said stop means allowing the cutting means to be moved toward the object when the cutting means is rotated with the rotatable member, the carriage being provided with a second stop means engaging the cutting means to arrest the rotational movement of the cutting means but not the rotational movement of the rotatable member, the cutting means including a torch, means for supplying a first combustible mixture to the cutting torch when the rotatable member and the cutting means are both rotated with the object for preheating an area of the object, and means for supplying a second combustible mixture to the cutting torch when the rotatable member rotates relative to the cutting means for cutting through the object around the cutting circle, means in the path of the carriage to cause the clamping means to be released from the object after cutting of the object is completed, and return means for returning the carriage, the rotatable portion and the cutting means, to their original positions after the clamping means has been released, said return means being impeded by a latch means which prevents the return of the carriage until after the rotatable portion and the cutting means are returned.

17. Apparatus for cutting to length a longitudinally moving elongated object comprising, a carriage, means for clamping the carriage to the object so that the carriage is moved in one direction longitudinally with the object, and a cutting means supported by the carriage for cutting the object while the carriage is moved with the object, means in the path of the carriage to cause the clamping means to be released from the object, and return means for returning the carriage to its original position after the clamping means has been released, said return means comprising a weighted cable connected to the carriage for biasing the carriage in one longitudinal direction.

References Cited in the file of this patent

UNITED STATES PATENTS

| | | |
|---|---|---|
| 1,861,923 | Jones et al. | June 7, 1932 |
| 1,930,295 | Von Henke | Oct. 10, 1933 |
| 2,063,498 | Glick | Dec. 8, 1936 |
| 2,221,788 | Doyle | Nov. 19, 1940 |
| 2,417,412 | Herbst | Mar. 18, 1947 |